Patented June 23, 1953

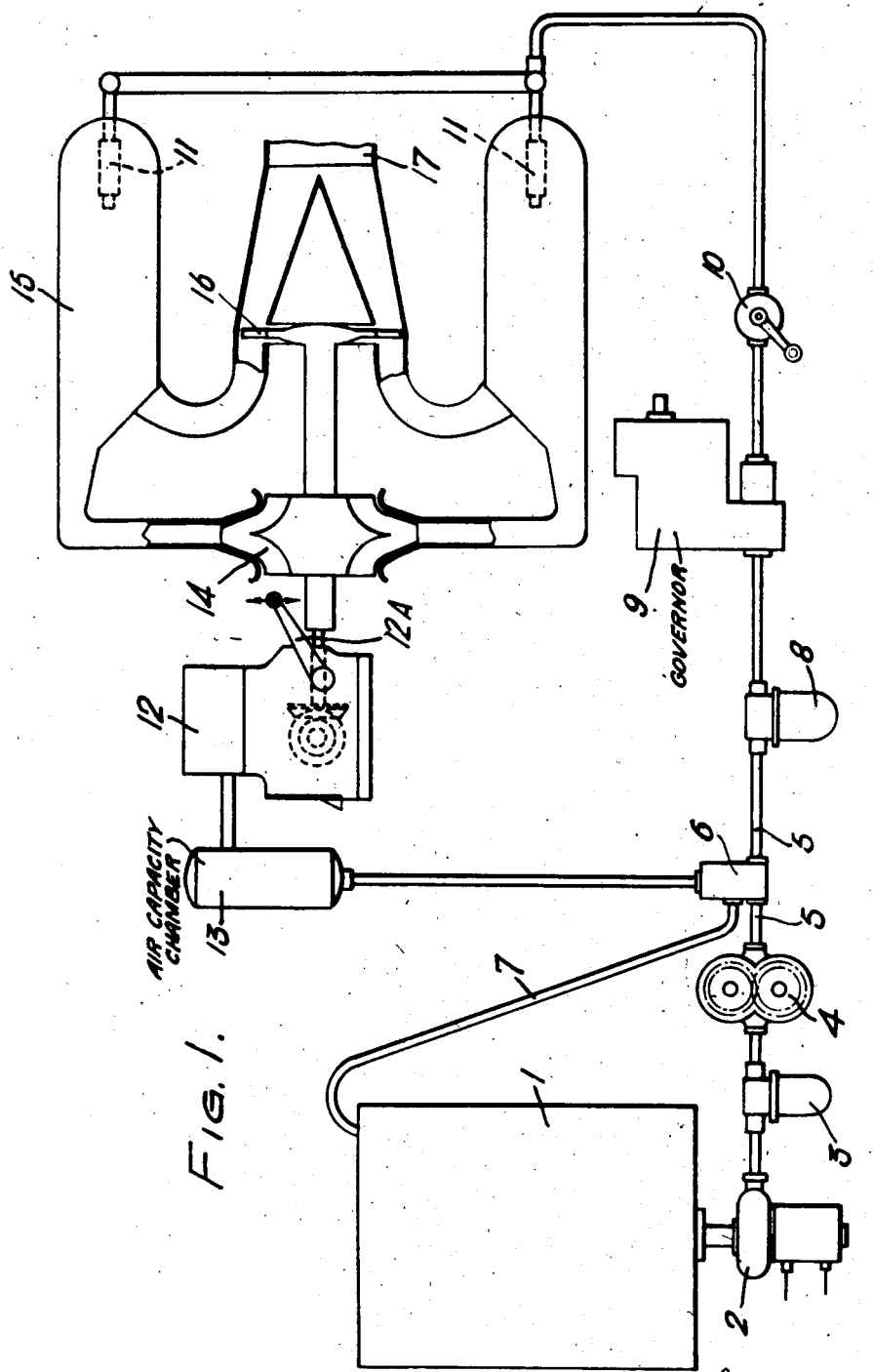

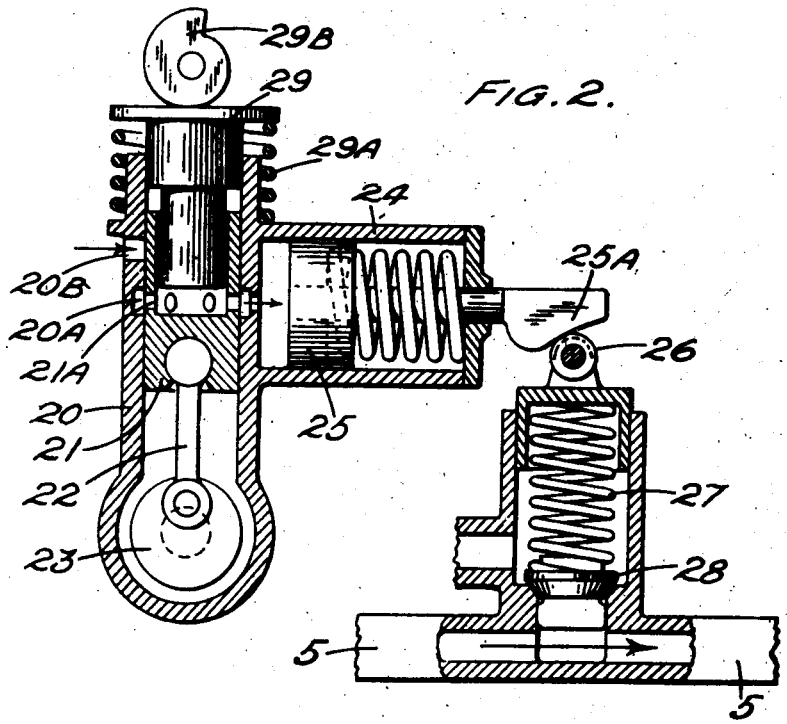
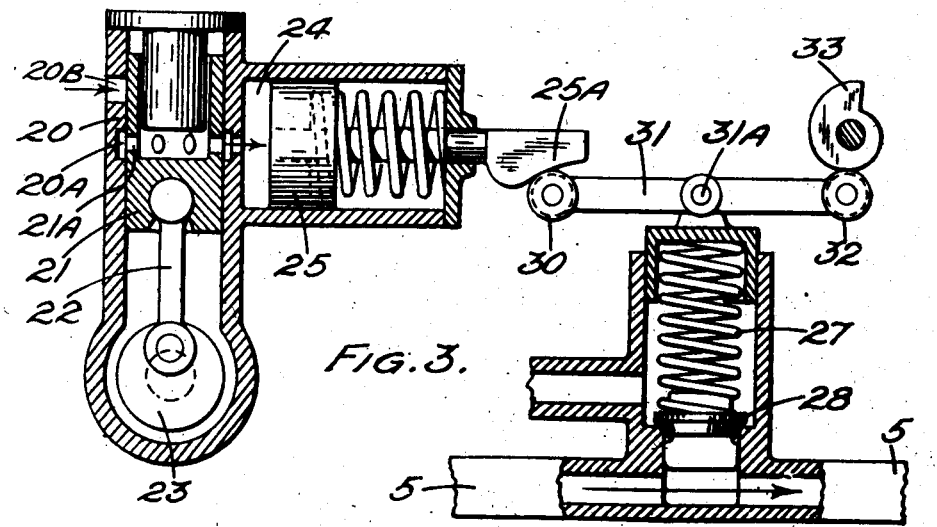

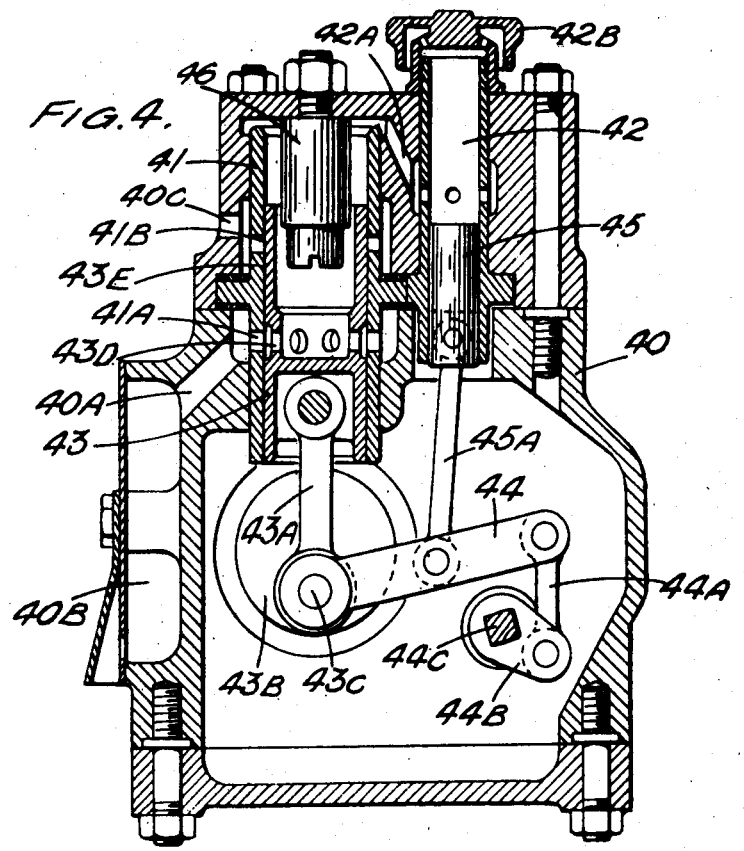
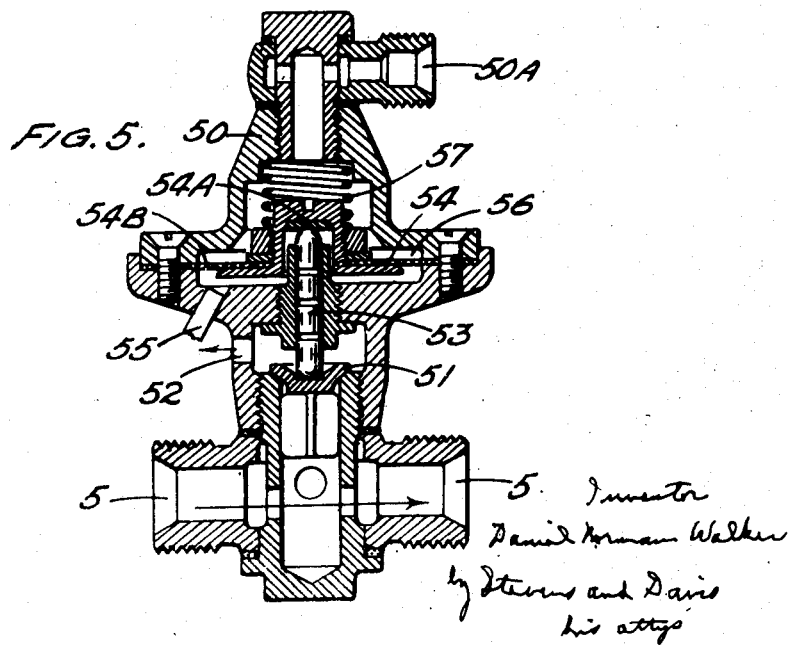

2,642,719

UNITED STATES PATENT OFFICE 2,642,719

ENGINE FUEL CONTROL FOR INTERNAL EXPANSION ENGINE FUEL SYSTEMS

Daniel Norman Walker, Ashby Parva, near Rugby, England, assignor to Power Jets (Research & Development) Limited, London, England Application October 30, 1945, Serial No. 625,550
In Great Britain August 14, 1942

Section 1, Public Law 690, August 8, 1946
Patent expires August 14, 1962

6 Claims. (Cl. 60—39.28)

This invention relates to pressure-sensitive control devices for aero engines and more particularly to devices which are required to operate in accordance with the ambient pressure of air, for example in accordance with atmospheric pressure at varying altitude, at the same time being dual controlled by an operator or possibly by governing means.

In certain throttle or fuel supply systems of aero-engines, and in similar cases, it is sometimes required to provide means by which a control device can be operated (and may require a substantial effort to be operated) in accordance with the ambient pressure and also by hand. Previously such control has been accomplished in some cases by the use of a barostatic capsule controlling a valve system which in turn controls a servo-fluid, the pressure of which affords operative effort, the dual control being a separate system. Such devices have their draw-backs and it is an object of this invention to provide control means of a simple and reliable nature which in many applications will not require any servo-mechanism or which may be said to be itself a servo-mechanism and which is well adapted to the provision of dual control such, for example, as further manual control.

The invention is a means for controlling an aero-engine, more especially though not exclusively one in which fuel is supplied under considerable pressure, of which the fuel consumption varies greatly in accordance with altitude, and of which the running speed (R. P. M.) is determined by the rate of fuel supply, it is proposed in one such case, to employ the invention as a means for controlling the relief valve which determines the fuel pressure and therefore rate of supply to the engine. Alternatively, a variable-delivery fuel pump may be the thing controlled. In cases in which suitable characteristics exist, the system may be employed as a speed-governing system which reacts to ambient pressure. It should, however, be pointed out that the invention may be found to have other applications such, for example, as the dual control of boost pressure of aero-engines, or other aero-engine control devices, the operation of which has to be related to altitude or ambient pressure.

The underlying idea of the invention is the use of an independent air pump which for any given conditions of running is a pump of constant compression ratio (so that its output pressure is a function of ambient pressure) to operate a required device, such as a variable spring load on a relief valve or directly cause the load on the valve whilst means are further provided for affecting dual control of such device, for example manually. The second or dual control may affect the delivery of the pump itself as creating variations of effective compression ratio, or may affect the device controlled in part by the pump output by direct operation.

The term "independent" in connection with the air compressor means that the compressor does not take part in the supply of air as working fluid in the engine, that is to say, the independent compressor is different from any compressor which is in the nature of a supercharger or precompressor of working fluid.

The invention has an important application to an aero-engine of the kind comprising a compressor, combustion arrangement, and gas turbine, all arranged as a jet-propulsion power plant. Engines of this kind have a fuel supply system at comparatively high pressure, in which the rate of fuel delivery is determined by this pressure, and is, moreover, required to be reduced substantially with every increase of altitude. In such an engine there is an engine-driven positive displacement fuel pump (e. g. a gear pump) with sufficient capacity to deliver the maximum engine requirement with a margin for safety. It is to be noted that such engines may have relatively limited rates of acceleration when they are running in the lower range of their speeds. That is to say, they may have a poor throttle response at low R. P. M. and improving acceleration and response as the R. P. M. increases. It follows that ideally the control system should prevent excessive rates of increase of rate of fuel delivery in the lower speed ranges, and this is a matter which the invention can look after. In applying the invention there is provided as independent compressor a single-cylinder air pump driven positively at constant speed ratio by the engine. This pump has its intake opened to the ambient atmosphere, i. e. that which the engine is supplied with air, delivers to a volumetric capacity and thence to a cylinder in which works a piston which controls the load on a relief valve in the fuel supply line. Manual means are provided for varying the air pump compression ratio. The operation of the device is as follows:

Assume the engine to be running and the relief valve spring setting to be such that in the idling condition, and with the minimum air pump compression ratio, the fuel pressure is appropriate to idling. When it is desired to accelerate the engine the air pump compression ratio is increased and its delivery pressure therefore increases.

whereupon the relief valve spring load is increased and the fuel pressure rises, in turn causing the engine to accelerate until a higher stable speed is reached. The effect of the capacity mentioned is to prevent unduly rapid increase of rate of fuel supply at low engine (and therefore pump) R. P. M. In higher ranges of R. P. M. however the air pump speed being higher the capacity is proportionally less effective as a delaying factor to pressure rise.

Now let it be supposed that with stable engine speed and without further operation of the manual control, the altitude is increased and therefore the atmospheric pressure is decreased. The air pump, now operating with constant compression ratio, will deliver less pressure so that the relief valve spring load will decrease and the fuel supply pressure will correspondingly decrease. Conversely, if altitude is now decreased, the fuel pressure wil automatically increase. At all times the manual control can be used to adjust the fuel pressure and it therefore assumes the function of a throttle control.

It will be evident from the foregoing brief description that the air pump device may have other applications or other uses in the given application; for example, a tapping from the delivery of the pump may be used to operate other devices which are required to respond in proportion to atmospheric pressure such as aircraft cabin pressure or pressure above the fuel in fuel tanks, instruments, or the like.

The drawings illustrate the invention as it may be applied in one embodiment, together with schematic diagrams to illustrate the function of the device and to indicate an alternative application.

Fig. 1 is a diagram illustrating a fuel system embodying the invention.

Fig. 2 diagrammatically illustrates an independent compressor and relief valve to demonstrate the function, according to one application, of the invention.

Fig. 3 diagrammatically illustrates an independent compressor and relief valve to demonstrate an alternative function and mode of use.

Fig. 4 is a sectional view of an actual compressor intended for use in accordance with the function of Fig. 2.

Fig. 5 is a sectional view of a relief valve adapted for use with the compressor of Fig. 4.

Referring first to Fig. 1, the fuel system as a whole comprises a supply tank 1, from which the fuel is delivered through a motorised centrifugal low-pressure pump 2 through a low-pressure filter 3 to the main fuel pump 4 which is an engine driven positive displacement pump such as a gear pump. The fuel pumped at 4 is taken by the main high-pressure pipe 5 to the body of a relief-valve 6, which controls the pressure in the pipe 5. Fuel passing through valve 6 is returned to the tank 1 by return or spill-pipe 7. Fuel at the required delivery pressure flows through a high pressure filter 8, a centrifugal or other governor 9 (if required) and a shut-off cock 10 to a burner manifold interconnecting burners 11. Such a fuel system, corresponds substantially with known practice, but no throttle valve is provided, this function being replaced by the invention, in that the load on relief valve 6, is variable and is attributable to the output pressure of an independent air compressor 12, which has a variable compression ratio adjustable by a control lever (12A) and is itself driven by the engine to which fuel is supplied. The engine may be a gas turbine aero engine wherein the output from an air compressor 14 is brought to combustion together with fuel injected by burners 11 in combustion chambers 15, the hot gases then driving a turbine 16 which itself drives the compressor 14, and being finally ejected to atmosphere at an outlet 17 to form a propulsive jet stream. For a special purpose later stated, an air capacity chamber 13 may be interposed between the compressor 12 and valve 6.

In Fig. 2, is represented a compressor and relief valve for use at 12 and 6 in Fig. 1, drawn to demonstrate function, and shows a possible, though not a preferred, way of connecting the compressor to the relief valve. The compressor is a single acting reciprocating compressor with cylinder 20, piston 21, and connecting rod 22, driven by a crank 23. The piston 21 is upwardly skirted and this skirt has an outlet port ring 21A to register with an annular outlet port 20A in the cylinder 20, which is connected to a ram cylinder 24. The cylinder 20 has an inlet port 20B from atmosphere. In the cylinder 24 is a spring loaded ram 25 which operates a sliding cam 25A, arranged to bear on a follower 26, the movement of which are transmitted to a compression spring 27 to vary the load therein, which load is applied to a relief valve 28 in a branch duct off the main fuel line 5. Slidable in the top of the cylinder 20 is a movable compression head 29 which has an extension within the skirt of the piston 21 to maintain a reasonably high order of compression ratio, the head 29 is urged outwards by a spring 29A against an operator's cam 29B, rotation of which enables the user to vary the compression ratio of the compressor. The crankshaft 23 being positively driven by the engine to which the fuel is being supplied, the speed of which is a function of the rate of fuel supply, the following describes the function of this device.

At starting, the fuel pump 4 raises the pressure in pipe 5, up to that which is maintained by the spring 27 on the relief valves 28. This is established to be a suitable starting and/or idling pressure. As soon as the engine is properly running, the compressor being now driven, tends to urge the ram 25 outwards, the effective extent to which it does so being controlled by the spring of this ram, the shape of the cam 25A and the spring 27, and the pressure of air delivered by the compressor. In the starting or idling condition the head 29 is fully out, the compressor pressure-rise from atmospheric being too slight to have an effect on the relief valve 28. Now if the operator by rotating cam 29B closes down the head 29 the compression ratio of the compressor, and therefore the delivered pressure, increases. The effect of this is, at some stage, to move the cam 25A (to the right) thereby loading up the relief valve 28 by compressing the spring 27. Consequently the fuel pressure in pipe 5 rises, and more fuel is passed to the burners 11 so that the engine responds by accelerating until a new stable speed it reached.

It is clear that the cam 29B has the functional nature of a "throttle control" in that it controls the engine speed. If the head 29 is allowed to move outwards, the compression ratio being reduced the compressor will actually pass air backwards from the ram cylinder 24 to atmosphere, until stability occurs at a reduced engine speed. It seems hardly necessary to describe the relationship of the piston 21 and the ports 20B, 21A which represent a standard arrangement for a simple compressor.

Now let it be supposed that the device is operating and the engine running at a selected speed in a climbing aircraft. The atmospheric pressure is progressively decreasing as altitude increases. It follows that the delivery pressure from the compressor decreases likewise (the compression ratio being, for the time being, fixed) so that the load on valve 28 is progressively reduced, and the pressure in pipe 5 correspondingly reduced. Thus the rate of fuel supply is automatically varied with change of atmospheric pressure at the compressor intake. This corresponds with the fuel requirement of the engine, so that the engine speed may remain constant despite the change of altitude.

The foregoing, as well as describing the operation of the particular form of the device, well exemplifies the main object of the invention, in that it demonstrates the dual function of operator's speed control and automatic altitude response. By particular selection of compressor characteristics, cams, spring ratio, and burner pressure/flow characteristics the employment of a speed governor such as 9, may be obviated, but it is at present regarded as desirable to provide it as a top speed governor in the interests of engine safety.

Turning now to Fig. 3, wherein as many of the same references are used as possible, an alternatively functioning scheme is depicted. Here again are a compressor and a relief valve, but the compressor is of fixed compression ratio. In this case its ram operates the cam 25A over a follower 30 on one end of a lever 31 the fulcrum of which at 31A reacts on the relief valve spring. The other end of the lever 31 has a second cam follower 32 cooperating with an operator's cam 33. The relief valve load is thus applied differentially by the effect of the compressor delivery pressure (which as shown varies with altitude) and the effect of the cam 33, which is under the operator's control. The arrangement presupposes that the forces applied by either cam cannot be such as to result in resultant movement of the other. Then if cam 33 be moved to depress the follower 32, more load is applied in spring 27 with consequent increase of engine speed by virtue of increased fuel pressure.

Also, however, changes of altitude affect the position of the cam 25A and these in turn affect the load on the relief valve. Thus again is seen the operator controlled function and the altitude controlled function.

In actual practice, it is proposed not to employ the cam mechanism of Fig. 2. As will be gathered from Fig. 1, (later to be amplified by reference to Figs. 4 and 5) the proposed practice is to lead the delivery from the compressor more directly to load the relief valve spring. If in such an arrangement, and air capacity chamber (13 of Fig. 1) is interposed in the air connection between compressor and relief valve, another function can be introduced, namely control of acceleration. It is to be understod that in some cases of engines with this type of fuel systems, the ability to accelerate rapidly from low R. P. M. is somewhat defective, at least if excessive temperatures are not tolerable. On the other hand, in a higher range of R. P. M. acceleration can be very rapid without excessive temperatures. A capacity such as 13 can be made to prevent excessive rate of increase of rate of fuel supply in the lower speed range, because if the capacity of the compressor 12 is small in relation to that of 13, a marked time factor is introduced in the rate at which the compressor pressure builds up on the relief valve, and a factor within this is the driving speed of the compressor. Thus at low engine R. P. M. the relief-valve-controlled pressure rise (via pipe 5) is limited, preventing the operator from too rapidly increasing the fuel supply, whilst at higher R. P. M. the time-lag (due to the capacity 13) is proportionately less, so that virtually immediate response to operator's movement is approached. In the converse case of deceleration of R. P. M., the capacity 13 may serve a further useful purpose in preventing a too rapid rate of reduction of rate of fuel supply which in some cases might be disadvantageous.

Fig. 4 illustrates a practical form of compressor devised to meet the requirements of the invention. This is a single-cylinder single-acting pump with a main body 40 comprising a crankcase and cylinder and valve accommodation. Within the body is mounted the cylinder 41 which has inlet ports 41A connected to an inlet passage 40A of the body 40, a protected cavity 40 serving to prevent ingress of foreign matter. The cylinder has outlet ports 41B connecting through an annular space to a suitable outlet union provided through the body 40, and not illustrated except diagrammatically as a passage 40C. The top end of the cylinder 41 is open to a passage 42A which connects to a valve cylinder 42, the upper end of which is open to atmosphere through perforations in a protective cap 42B. The piston 43 of the compressor is worked by a connecting rod 43A driven by a crank 43B through crankpin 43C. The crank is engine-driven. The piston 43 is ported at 43D through its upwardly extending skirt 43E, the ports registering alternately with the ports 41A and 41B at bottom and top of stroke. Articulated on the crankpin 43C is a link lever 44, to which is pivoted a valve rod 45A to reciprocate the valve 45, which slides in the valve cylinder 42. The outer end of the link lever 44 is located by a link 44A adjusted by a crank 44B on an operator's spindle 44C borne in the body 40. Rotation of the spindle 44C alters the setting of the valve 45, the function of which is to cut off the passage 42A during a greater or lesser part of the stroke of piston 43. If, for example, it were arranged that the valve 45 could be left so low that the passage 42A is never cut off, no compression results. By progressively raising the valve 45 the effective compression ratio of the compressor is under full control. A compression head 46 is provided, to reduce the effective clearance volume of the compressor so as to give a higher maximum compression ratio whilst preserving practicable dimensions and a reasonably long working stroke.

Such a compressor is intended to be used with a relief valve as in Fig. 5. The outlet 40C from the compressor is connected (through a capacity if required) to the air connection union 50A to a relief valve body 50. At the lower end of the body 50 is a T connection, two lateral branches of which pass the main fuel supply (indicated by arrow) whilst the third, upward, branch forms a guide passage and seat for the relief valve 51. Within the body 50 above the valve 51, is a space from which fuel which has passed the valve escapes by the passage indicated at 52 to return to the fuel tank (by pipe 7 of Fig. 1.) Above this space is a guideway for a pushrod 53 which is made as nearly as possible a fluidtight through slidable fit in the guideway. The pushrod 53 bears on the centre of the valve 51 downwards and reacts upwards against a hard steel plate 54A inserted in a central pocket of a diaphragm plate 54 which partially supports an annular flexible diaphragm 54B, the periphery of which is secured in the body 50. Below the diaphragm constituted by 54—54B is an air space breathed and drained by a passage 55 to atmosphere or through a pipe to any desired place. Above the diaphragm is a pressure space 56 which houses a spring 57 which exerts a selected load downwards on the diaphragm plate 54 and through rod 53 on to the valve 51. This spring load determines the minimum pressure at which the valve 51 will open, and the rate of the spring may also somewhat modify the precise behaviour of the system in various running conditions. The connection at 50A leads to the pressure space 56, thus submitting the diaphragm as a whole to a downward pressure which is transmitted to the valve 51 as a load additional to that of the spring 57. This relief valve is thus variable as to its blow-off pressure, in accordance with the pressure generated by the compressor. In function the arrangement will be seen to be practically the same as the arrangement of Fig. 2.

The mechanical aspects of the device have not been described in great detail, there being nothing involved which calls for the application of more than ordinary engineering skill and technique. It will be obvious that lubrication, protection against dirt, etc., will be provided as required, and that provision may be made for adequate access for adjustment replacement or inspection of working parts.

I claim:

1. A fuel flow control system for airplanes comprising an engine, a fuel pump, a fuel supply line connecting said fuel pipe and engine, a fuel regulator in said line, an expansible chamber positive displacement air compressor having a chamber, said compressor being driven from said engine at a speed in fixed proportion to the speed of the engine, means defining a closed pressure zone, the chamber of said compressor being alternately in free communication with atmosphere and said closed pressure zone, and means movable in response to pressure changes in said zone for actuating said regulator.

2. An engine fuel control for an internal expansion engine fuel system including a fuel supply, conduits for said fuel, and an engine driven fuel pump supplying said engine with fuel at a pressure comprising a positive displacement type air compressor driven by said engine and aspirating from ambient atmosphere and with its delivery pressure arranged as a predetermined function of the inlet air pressure irrespective of engine speed and of inlet pressure and functioning as an air compressor solely for said engine fuel control, a compressed air receiving means defining a vessel closed to ambient atmosphere but in direct communication with said compressor for receiving said compressed delivery air, an engine fuel flow control device connected in said fuel system conduit having means to control the fuel flow therein and having fuel flow control actuating means arranged in association with said compressed air receiving means to actuate said fuel flow control means in response to the compressor delivery pressure in said receiving means, compression ratio varying means in said compressor to vary the delivery pressure and manual means for actuating said compression ratio varying means for varying said compression ratio and in consequence for varying said delivery pressure and said fuel flow, the arrangement being such that the engine fuel flow is controlled in accordance with the magnitude of any pressure change caused by a change in both intake pressure and in compression ratio of said compressor.

3. An engine fuel control according to claim 2 wherein the said compressor is of the cylinder and reciprocating piston type and the said compression varying means comprises mechanism associated with said piston and cylinder for varying the clearance volume of said compressor.

4. An engine fuel control according to claim 2, wherein the compressor is of the cylinder and reciprocating piston type and said compression varying means comprises a movable compression head slidable in said cylinder to vary the clearance volume of said cylinder and spring urged in a direction to increase the clearance and decrease the compression ratio and manually urged in opposition to said spring to decrease the clearance and increase the compression ratio.

5. An engine fuel control according to claim 2, wherein said engine fuel flow control device comprises a fuel pressure relief valve in said conduit and an air pressure loading means influenced by said compressor delivery pressure in said receiving means to load said pressure relief valve.

6. An engine fuel control according to claim 2 wherein the said fuel flow control device comprises a spring loaded fuel pressure relief valve in said conduit and a pressure loading piston in a cylinder influenced by said compressed delivery pressure in said receiver to load said spring.

DANIEL NORMAN WALKER.

References Cited in the file of this patent

UNITED STATES PATENTS

| Number | Name | Date |
| --- | --- | --- |
| 1,510,688 | LaFon | Oct. 7, 1924 |
| 1,920,752 | Kissing | Aug. 1, 1933 |
| 2,219,994 | Jung | Oct. 29, 1940 |
| 2,397,835 | Brame | Apr. 2, 1946 |
| 2,400,413 | Hersey | May 14, 1946 |
| 2,400,416 | Hersey | May 14, 1946 |